United States Patent
Hayashi

(10) Patent No.: US 10,375,269 B2
(45) Date of Patent: Aug. 6, 2019

(54) IMAGE PROCESSING DEVICE, IMAGE READING DEVICE, AND IMAGE FORMING APPARATUS

(71) Applicant: KYOCERA Document Solutions Inc., Osaka (JP)

(72) Inventor: Hironori Hayashi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/901,277

(22) Filed: Feb. 21, 2018

(65) Prior Publication Data
US 2018/0249040 A1 Aug. 30, 2018

(30) Foreign Application Priority Data
Feb. 24, 2017 (JP) .................................. 2017-033651

(51) Int. Cl.
*H04N 1/387* (2006.01)
*H04N 1/00* (2006.01)

(52) U.S. Cl.
CPC ....... *H04N 1/3873* (2013.01); *H04N 1/00336* (2013.01); *H04N 1/3878* (2013.01)

(58) Field of Classification Search
None
See application file for complete search history.

(56) References Cited

U.S. PATENT DOCUMENTS

| | | | |
|---|---|---|---|
| 2009/0231639 A1* | 9/2009 | Iwayama | H04N 1/3873 358/488 |
| 2012/0057795 A1* | 3/2012 | Konishi | G06K 9/32 382/195 |
| 2013/0083176 A1* | 4/2013 | Kasahara | G06T 11/60 348/61 |
| 2017/0187917 A1* | 6/2017 | Tanaka | H04N 1/2104 |

FOREIGN PATENT DOCUMENTS

JP 2002-010059 A 1/2002

* cited by examiner

*Primary Examiner* — Lennin R Rodriguezgonzalez
(74) *Attorney, Agent, or Firm* — IP Business Solutions, LLC

(57) ABSTRACT

A clip region recognition section recognizes clip regions from a read image. An inclination detection section detects an inclination of each of the clip regions. When the clip regions exist in number between P and Q, inclusive, a first processing control section executes a first clip processing. When the number is under P and over Q, a second processing control section executes a second clip processing. In the first clip processing, processing that an inclination correction section rotates the image according to the inclination of one of the clip regions and that a clip processing section cuts out the clip region is performed on each clip region. In the second clip processing, a clip region selection section selects one of the clip regions, the inclination correction section rotates the image according to the inclination of the selected clip region, and the clip processing section cuts out all the clip regions.

9 Claims, 10 Drawing Sheets

IMAGE PROCESSING DEVICE, IMAGE READING DEVICE, AND IMAGE FORMING APPARATUS

INCORPORATION BY REFERENCE

This application claims priority to Japanese Patent Application No. 2017-033651 filed on Feb. 24, 2017, the entire contents of which are incorporated by reference herein.

BACKGROUND

The present disclosure relates to image processing devices and image reading devices that read an original document and acquire an image and cut out a character and a photographic region from the acquired image, and to image forming apparatuses that print the acquired image.

Some of the image reading devices that read an image of an original document have functions of cutting out only a document image from the read image (i.e., clipping function). In the case where the original document placed on a document table is obliquely inclined, in performing the cut out, many of these clipping functions detect the inclination of the document image, correct the inclination of the document image to be cut out, and display and save the image.

As a general method, there is a method for cutting out the document image from the image read by an image reading device.

SUMMARY

A technique improved over the aforementioned techniques is proposed as aspects of the present disclosure.

An image processing device according to one aspect of the present disclosure includes a clip region recognition section, an inclination detection section, a clip region selection section, an inclination correction section, a clip processing section, a first processing control section, a the second processing control section, and a control section The clip region recognition section recognizes, as a clip region, each region of original documents included in an image. The inclination detection section detects an inclination of each of the clip regions. The clip region selection section selects one clip region out of the clip regions. The inclination correction section corrects an inclination of the image based on the inclination of the selected one clip region. The clip processing section cuts out the one clip region from the image having been subjected to the inclination correction. The first processing control section performs a first clip processing on each of all the clip regions recognized by the clip region recognition section. The first clip processing includes processing of: allowing the clip region selection section to select the one clip region; subsequently allowing the inclination correction section to correct the inclination of the image based on the inclination of the selected one clip region; and subsequently allowing the clip processing section to cut out the selected one clip region from the image having been subjected to the inclination correction. The second processing control section performs a second clip processing that includes processing of: allowing the clip region selection section to select the one clip region; subsequently allowing the inclination correction section to correct the inclination of the image based on the inclination of the selected one clip region; and subsequently allowing the clip processing section to cut out all the clip regions from the image having been subjected to the inclination correction. The control section selects, in accordance with a predetermined condition, either one of the first clip processing performed by the first processing control section and the second clip processing performed by the second processing control section.

An image reading device according to another aspect of the present disclosure includes an image reading section that reads one or a plurality of original documents as a single image and the above-described image processing device.

An image forming apparatus according to still another aspect of the present disclosure includes the above-described image reading device and an image forming section that prints the image read by the image reading device.

DETAILED DESCRIPTION

Hereinafter, a detailed description will be given of an image processing device, an image reading device, and an image forming apparatus according to an embodiment of the present disclosure with reference to the drawings. In the embodiment, the image forming apparatus will be taken up an as example of the image reading device of the embodiment.

Figure 1:
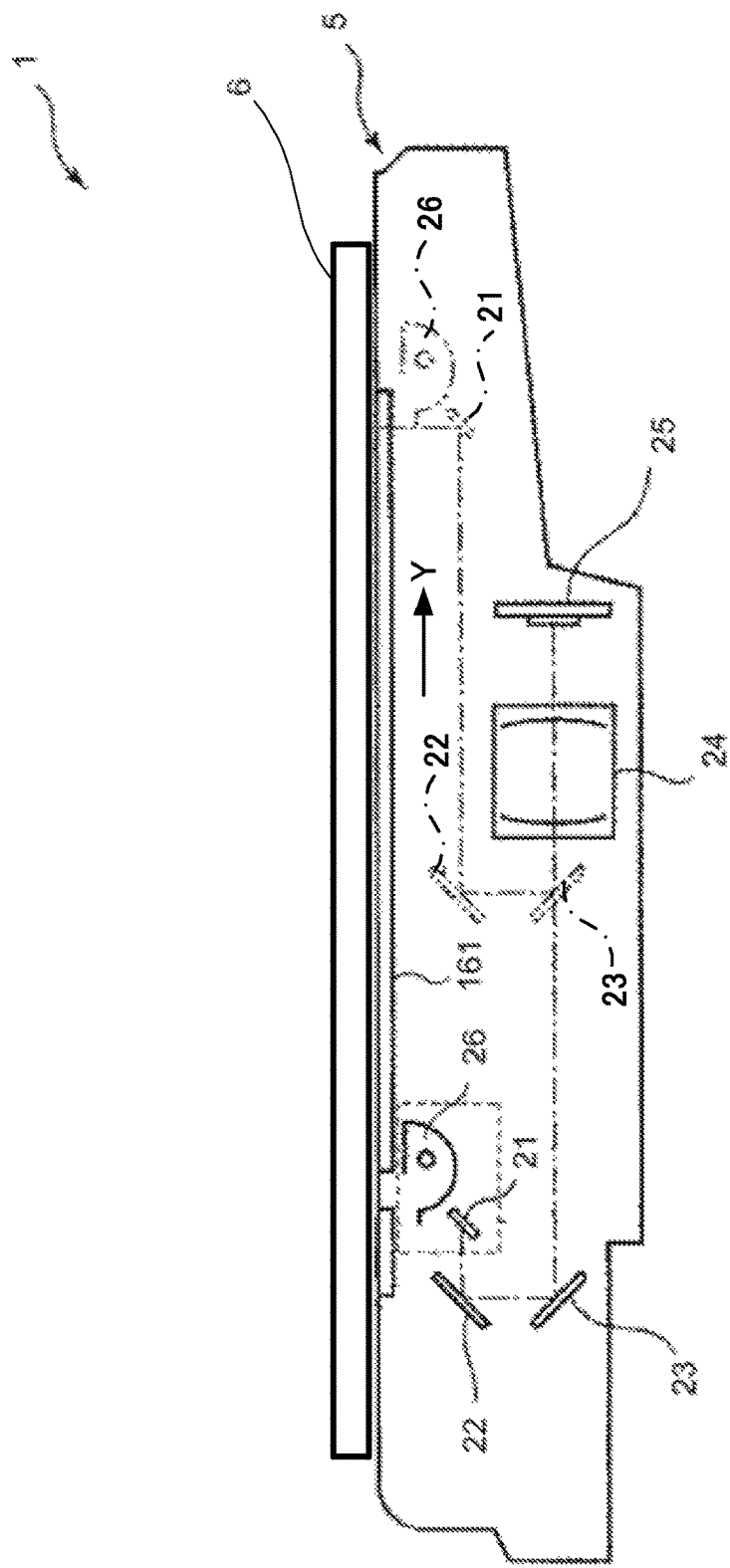
FIG. 1 is a cross-sectional view schematically showing an entire configuration of an image reading device.

FIG. 1 is a cross-sectional view schematically showing an entire configuration of an image forming apparatus 1. On the upper face thereof, an image reading section 5 includes a contact glass 16 onto which an original document is to be placed. The image reading section 5 also includes: a light source 26 for irradiating the original document placed on the contact glass 16 with light; a first mirror 21 that reflects, to a second mirror 22, the light reflected from the original document; and a third mirror 23 and a lens system 24 that guide the reflected light to an image pickup device 25 formed up with an image sensor such as a charge coupled device (CCD) or a complementary metal oxide semiconductor (CMOS).

When a user places the original document on the contact glass 16 and closes a pressure plate 6, then presses a start button (not shown), the light source 26 emits light under control of a control section 100 to be subsequently described, and the light from the light source 26 is transmitted through the contact glass 16 and illuminates the original document. As result, the light reflected by the original document enters the first mirror 21 through the contact glass 16. Such incident light passed through the second mirror 22, the third mirror 23, and the lens system 24, then enters the image pickup device 25.

The image pickup device 25, which acts under control of the control section 100, converts the incident light into an electrical signal. A plurality of the image pickup devices 25 is aligned in a main scanning direction, to acquire an output value corresponding to one line in the main scanning direction.

Further, the light source 26, the first mirror 21, the second mirror 22, and the third mirror 23 are driven by a drive unit such as a motor (not shown) to move in a sub scanning direction (indicated by an arrow Y), at a constant speed. Thus, the image reading section 5 successively acquires, in the sub scanning direction, the output values corresponding to one line of the original document in the main scanning direction, and consequently reads the overall image of the original document.

Figure 2:
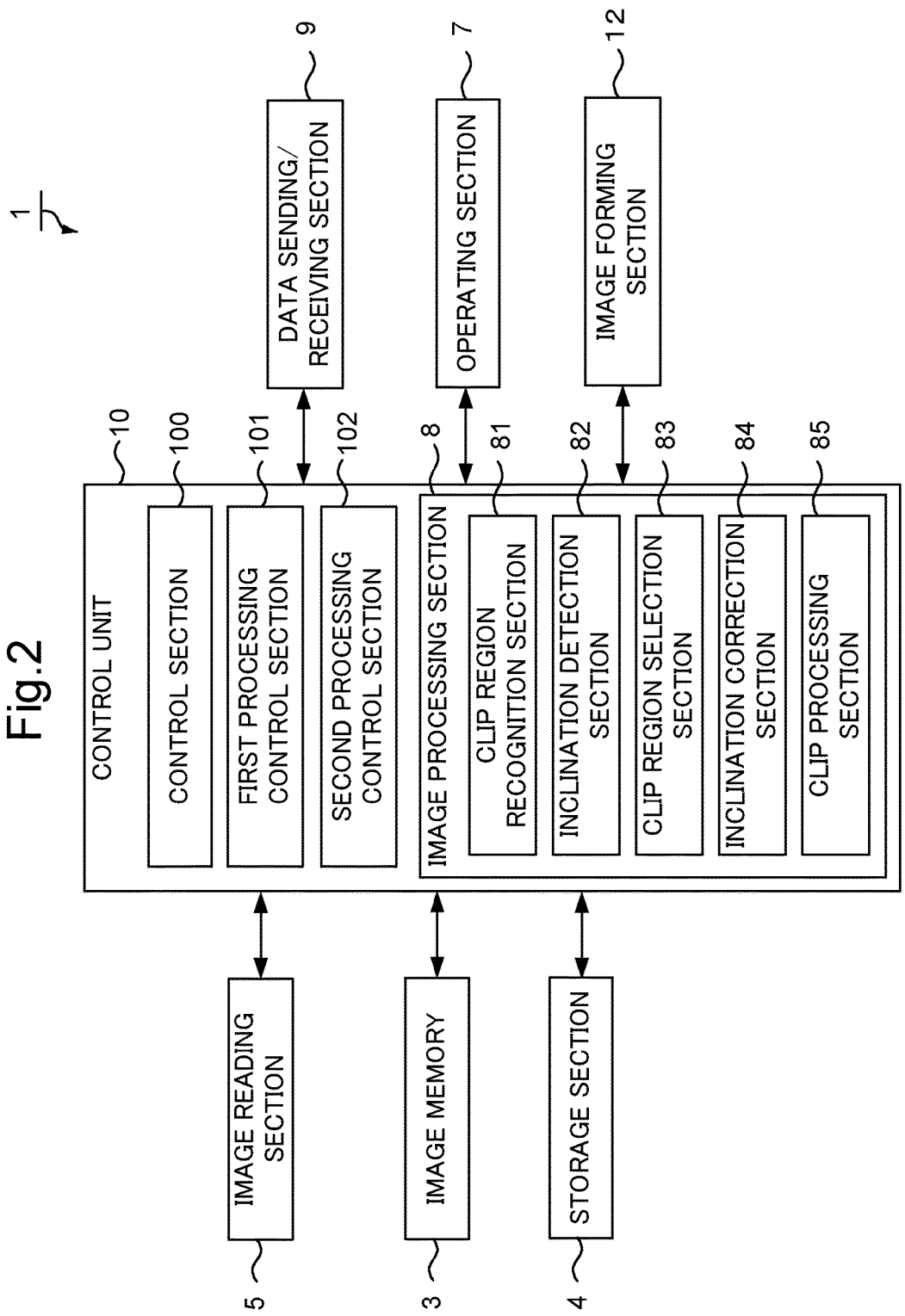
FIG. 2 is a functional block diagram showing an essential internal configuration of the image reading device.

FIG. 2 is a functional block diagram showing an essential internal configuration of the image forming apparatus 1. The image forming apparatus 1 includes a control unit 10, the image reading section 5, an image memory 3, a storage section 4, an operating section 7, an image forming section 12, and a data sending/receiving section 9. The components same with those shown in FIG. 1 are given the same reference numbers, and the descriptions thereof will not be repeated.

The control unit 10 includes a processor, a random access memory (RAM), a read only memory (ROM), and an exclusive hardware circuit. The processor is, for example, a central processing unit (CPU), an application specific integrated circuit (ASIC), and a micro processing unit (MPU). The control unit 10 also includes the control section 100, a first processing control section 101, a second processing control section 102, and an image processing section 8.

The control unit 10 functions as the control section 100, the first processing control section 101, the second processing control section 102, and the image processing section 8 by operation of the processor in accordance with a control program stored on the storage section 4. Alternatively, each of the above sections may not be implemented by the operation of the control unit 10 in accordance with the control program but may be constituted by a hardware circuit. Hereinafter, the same applies to the other embodiments unless otherwise stated.

The control section 100 governs the overall operation control of the image forming apparatus 1. The control section 100 is connected with the image reading section 5, the image forming section 12, the image memory 3, the storage section 4, and the data sending/receiving section 9 and performs drive control and the like on each of the above sections.

The image memory 3 temporarily stores data, for example, the data that the image reading section 5 has read and the data that the sending/receiving section 9 has received from an external device. The storage section 4 is formed with, for example, an HDD, and stores a program and data necessary for operating the image forming apparatus 1.

The image forming section 12 forms a toner image of an image to be printed onto a paper sheet (recording medium). The image memory 3 functions also as a region for temporality storing the data to be printed by the image forming section 12.

The operating section (input acceptance section) 7 accepts, from the user, instructions regarding various operations and processing executable by the image forming apparatus 1. For example, the operating section 7 includes hard keys such as a ten key, a start button for executing or stopping operations, and a reset button, and a display screen constituted of a liquid crystal display (LCD) or the like. The display screen is for displaying operation methods, messages, and operation buttons.

The image processing section 8 included in the control unit 10 performs various image processing on the data stored on the image memory 3. The image processing section 8 includes a clip region recognition section 81, an inclination detection section 82, a clip region selection section 83, an inclination correction section 84, and a clip processing section 85.

The clip region recognition section 81 detects, for example by utilizing a density difference in the original document and the contact glass 16, a document edge (the edge image) from the image read by the image reading section 5. The clip region recognition section 81 determines the clip regions by utilizing edge information indicated by the document edge: in other words, the clip region recognition section 81 recognizes the clip regions by this manner. Specifically, out of the image read by the image reading unit 5 from which the document edge is detected, the clip region recognition section 81 recognizes, as the clip region, a rectangular image whose four sides are surrounded as one piece by the document edge.

For example, in the case where a plurality of cards, such as business cards, is placed on the contact glass 16 and the image reading section 5 reads the plurality of cards at a time, the read image includes the images of the plurality of cards. In such case, for each of every card, the clip region recognition section 81 detects the document edge and recognizes the clip region.

The inclination detection section 82 detects the inclination of each of the clip regions. The clip region selection section 83 selects one of the clip regions recognized by the clip regions recognition section 81. Detailed descriptions of the selection method will follow.

In accordance with the inclination having been detected by the inclination detection section 82, the inclination correction section 84 corrects the inclination of the clip region that the clip region selection section 83 is choosing.

The clip processing section 85 performs cut-out processing (clip processing) in which each image of each clip region recognized by the clip region recognition section 81 is individually cut out from the document image.

The edge detection of the document image, the inclination detection of the clip region, the processing of the inclination correction can be performed by known technique, thus the detailed explanation of the above process are omitted herein.

The data sending/receiving section 9 performs data transmission and reception with respect to various data to and from an external device such as a personal computer in a local area or on the internet, through a LAN connected to the data sending/receiving section 9.

The control unit 10 further includes a first processing control section 101 and a second processing control section 102.

The first processing control section 101 performs following processing: based on the inclination of the selected one clip region, allowing the inclination correction section 84 to rotate the image; and allowing the clip processing section 85 to cut out the clip region. The first processing control section 101 performs the aforesaid processing on each of the clip regions individually. Hereinafter, the clip processing performed by the first processing control section 101 will be referred to as "first clip processing".

The second processing control section 102 performs following processing: based on the inclination of the selected one clip region, allowing the inclination correction section 84 to rotate the image; and allowing the clip processing section 85 to cut out all of the clip regions. Hereinafter, the clip processing performed by the second processing control section 102 will be referred to as "second clip processing".

Figure 3:
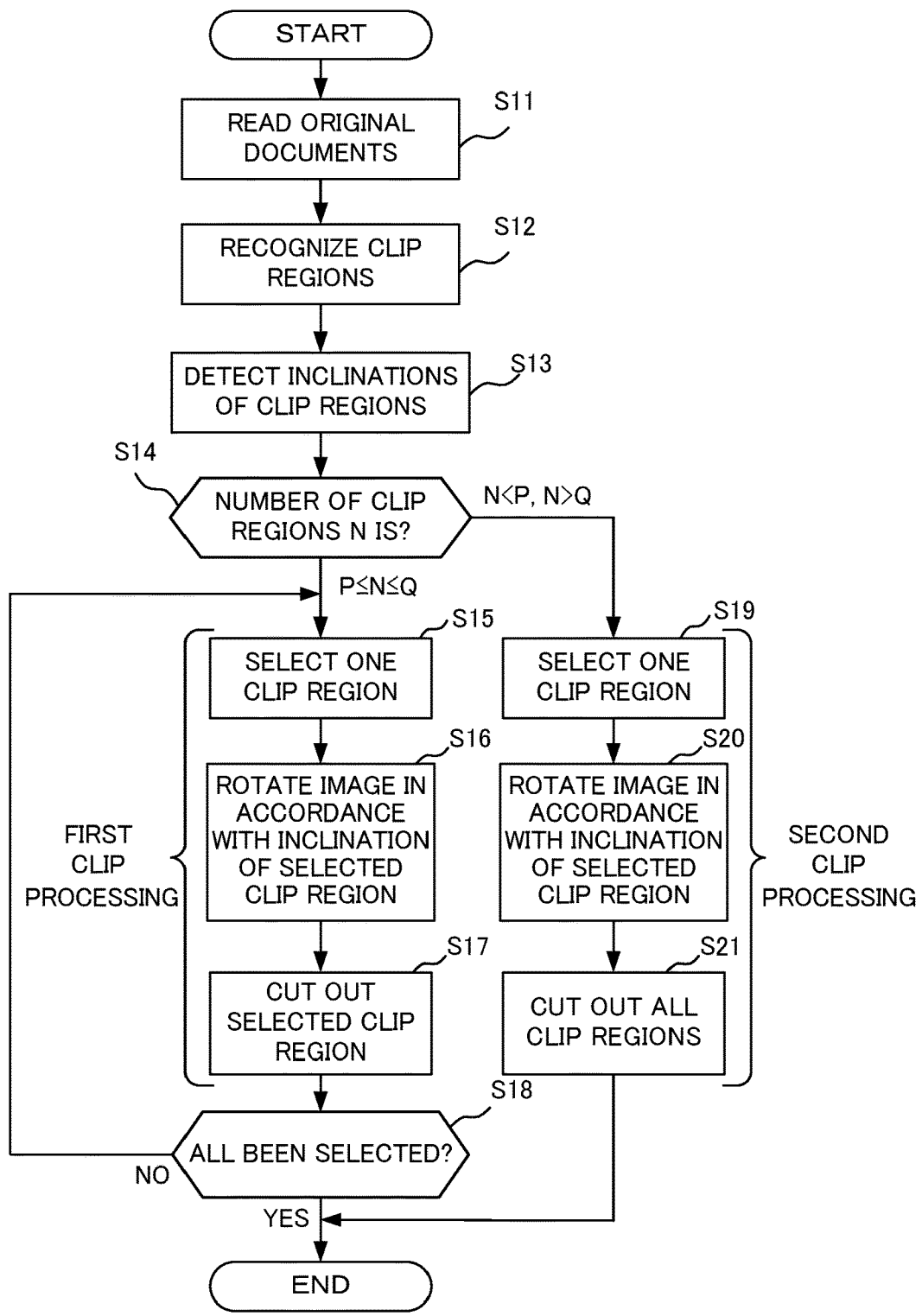
FIG. 3 is a flowchart showing a flow of a clip processing.
Figure 4:
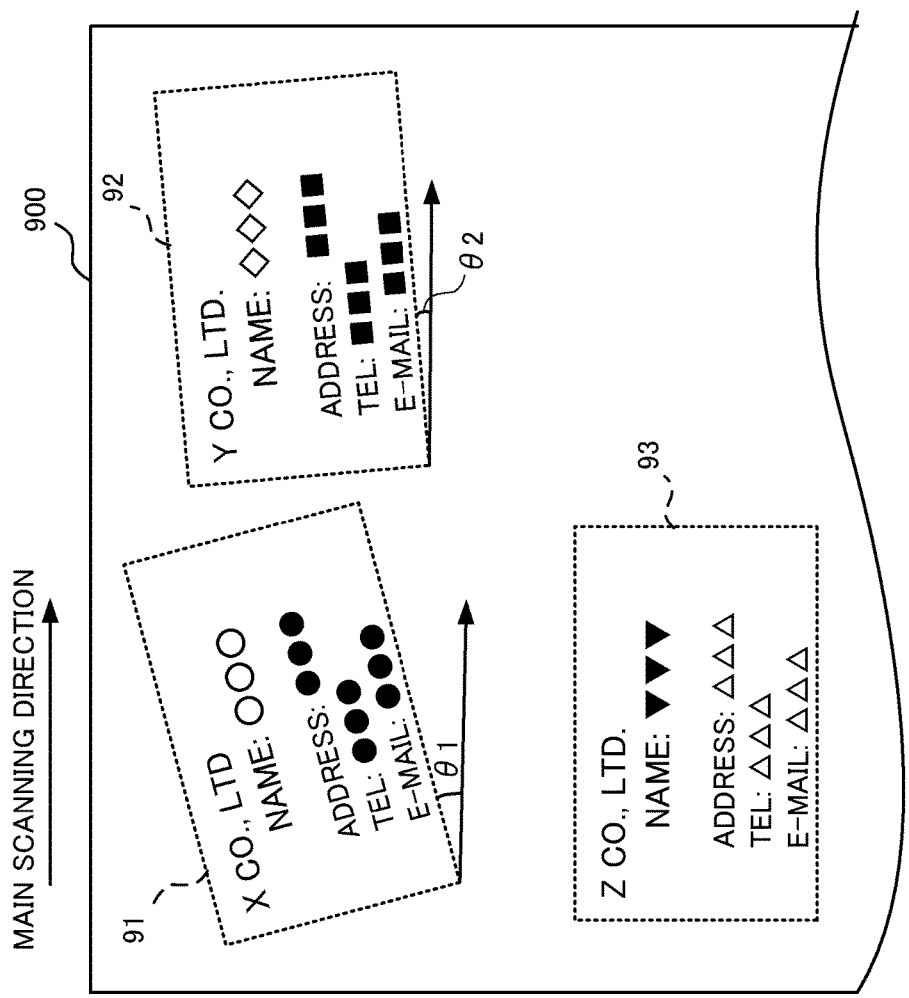
FIG. 4 is a view showing an example of an image read by an image reading section

FIG. 3 is a flowchart showing a flow of the clip processing according to the embodiment. As the first step, the image reading section 5 reads the original document placed on the contact glass 16 and acquires the image (step S11). A case where three business cards are placed on the contact glass 16 and the image reading section 5 reads those three business cards as one image is explained. FIG. 4 is an example of the image 900 read by the image reading section 5. The image memory 3 temporarily stores the image 900. In the present embodiment, the image 900 read by the image reading section 5 is a rectangular region whose four sides are straight lines.

The clip region recognition section 81 detects the document edges from the image 900 and recognizes the clip regions (step S12). In other words, the clip region recognition section 81 detects each of the document edge of the three business cards from the image 900 and recognizes each of the clip regions. Regions 91, 92, and 93 shown with broken lines in FIG. 4 are the clip regions.

The inclination detection section 82 detects the inclination of each of the clip regions (step S13). In the present embodiment, descriptions are given as taking the case where the inclination detection section 82 detects the inclination of a long side of the clip region with respect to the main scanning direction (the main scanning direction of the image reading section 5). In the example illustrated in FIG. 4, the inclination detection section 82 individually detects that the region 91 has the inclination of an angle of θ1, the region 92 has the inclination of an angle of θ2, and the region 93 has no inclination (i.e., an upper side of the region 93 is in parallel with the main scanning direction).

When the number N of the clip region is P or over and is Q or less in step S14, the control section 100 allows the first processing control section 101 to execute the first clip processing. In the present embodiment, in the case where "P is 3 and Q is 8" is exemplified. Namely, when there are 3 to 8 clip regions (the number of the business cards), the control section 100 allows the first processing control section 101 to execute the first clip processing; when the number of the clip regions is less than P (i.e., less than 3) and is R or over (i.e., not less than 9), the control section 100 allow the second processing control section 102 to execute the second clip processing. The aforesaid P is the first number and R is the second number described in What is claimed is. In the case shown in FIG. 4, the number of clip regions included in the image 900 is 3 (N=3), so that the first processing control section 101 executes the first clip processing.

The first clip processing begins with the process in which the clip region selection section 83 selecting one clip region (step S15). The selection of the one clip region may be performed on the three clip regions in any order in the step S15 because each of all the clip regions is selected and rotated one by one. The case where the clip region selection section 83 starts the selection of the one clip region in order from the top of the image 900 is taken as an example. That is, the region 91 is first chosen.

Figure 5:
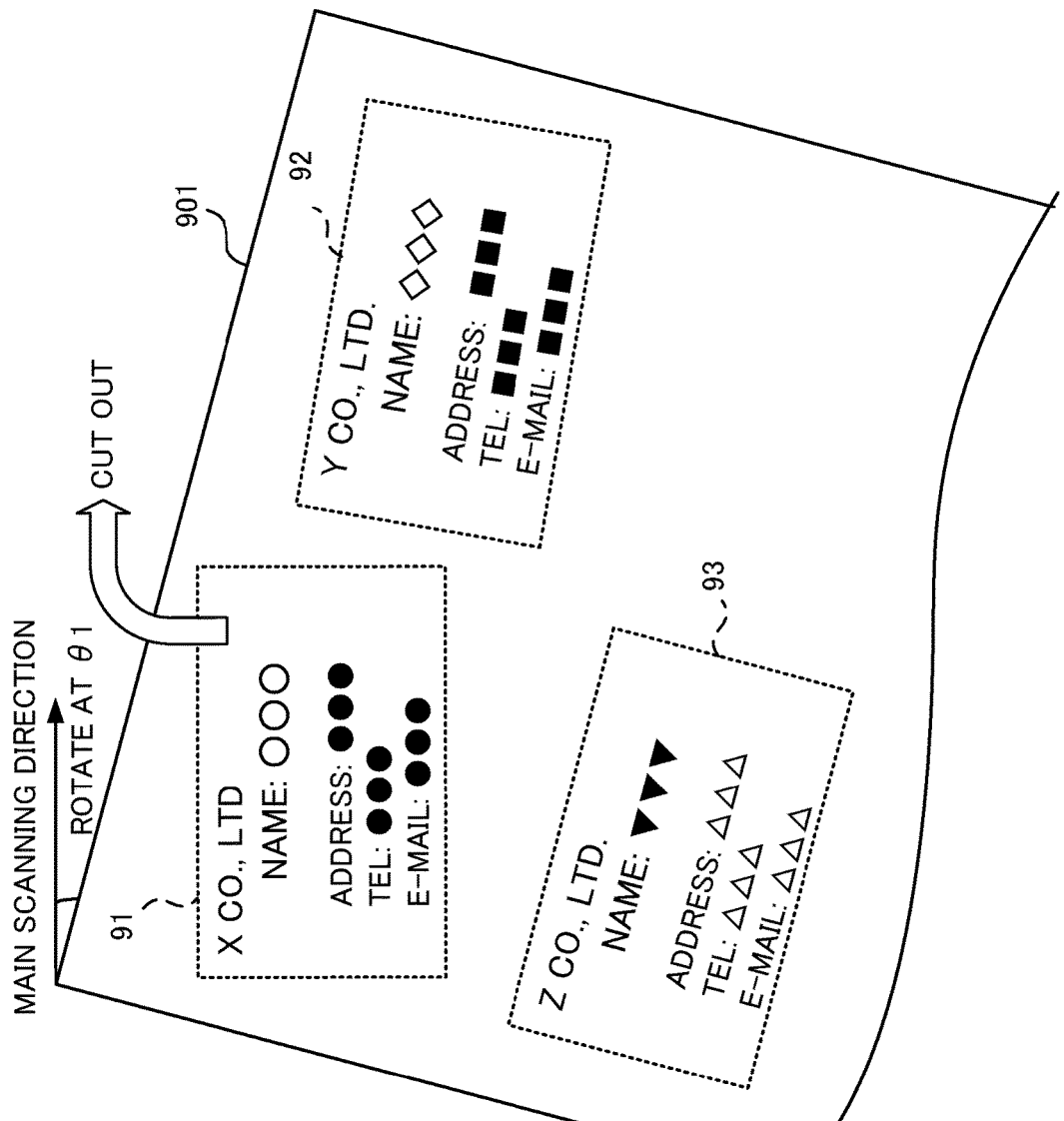
FIG. 5 is a view showing an example of the image after rotation.

Next, the inclination correction section 84 rotates the image 900, so that the inclination of the region 91 becomes 0 (step S16). If the region 91 inclines by the angle of θ1 in the counterclockwise direction from the main scanning direction, the inclination correction section 84 rotates the image 900 by the angle of θ1 in the clockwise direction. FIG. 5 is a view showing an example of an image 901 after rotation. The rotation makes the region 91 have the inclination 0 (i.e., an upper side of the region 91 is in parallel with the main scanning direction).

Figure 6:
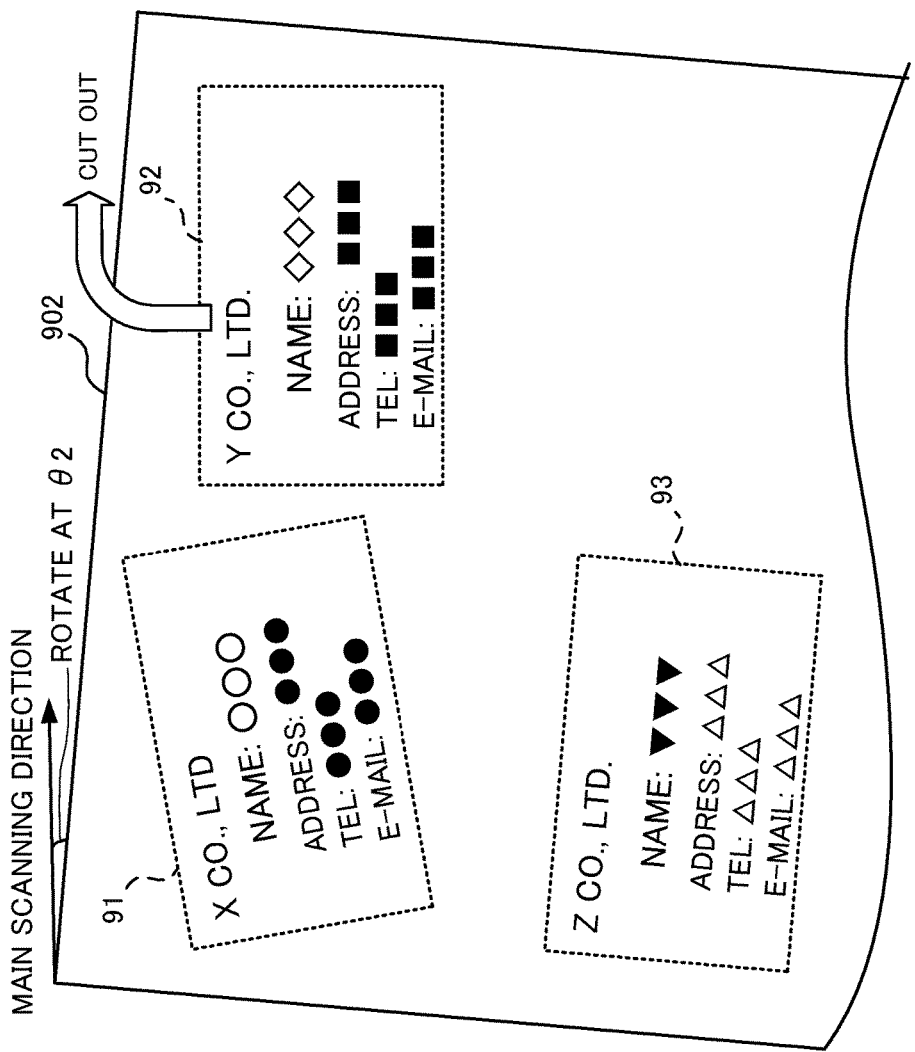
FIG. 6 is a view showing an example of the image after rotation.

Then, the clip processing section 85 cuts out the region 91 from the image 901 (step S17). When the clip processing is unfinished on all of the clip regions (NO in step S18), the first processing control section 101 repeats the process from step S15. That is, the clip region selection section 83 selects the region 92, and as shown in FIG. 6, the inclination correction section 84 rotates an image 902 by the angle of θ2 in the clockwise direction with respect to the main scanning direction, so that the inclination of the region 92 becomes 0, and the clip processing section 85 cuts out the region 92 from the rotated image 902.

Figure 7:
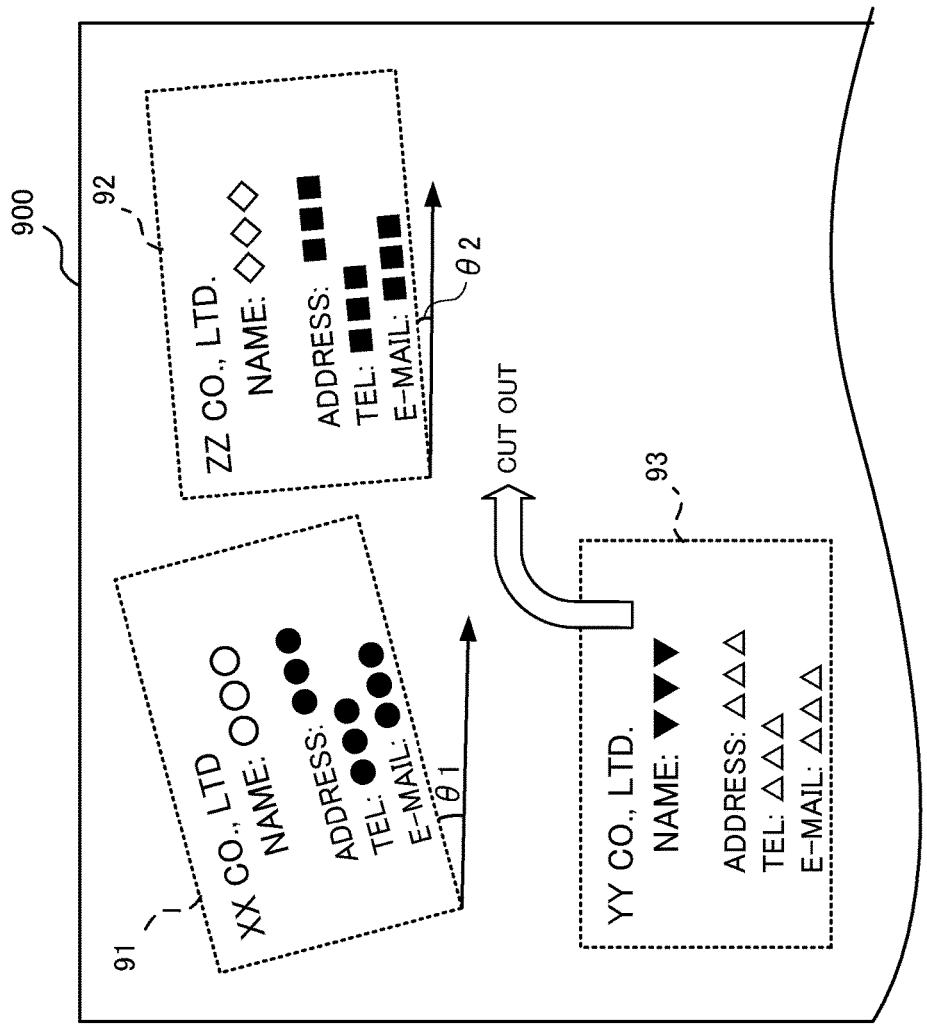
FIG. 7 is a view showing an example of the image after rotation.

Subsequently, the first processing control section 101 performs the above-described processing on the region 93 similarly. When the region 93 is not inclined with respect to the main scanning direction (i.e., when the upper side of the region 93 is in parallel with the main scanning direction), the inclination correction section 84 does not need to rotate the image 900 (i.e., the first processing control section 101 skips step S16), then, as shown in FIG. 7, the clip processing section 85 cuts out the region 93 from the image 900 as it is. The first processing control section 101 ends the processing afterword.

Figure 8:
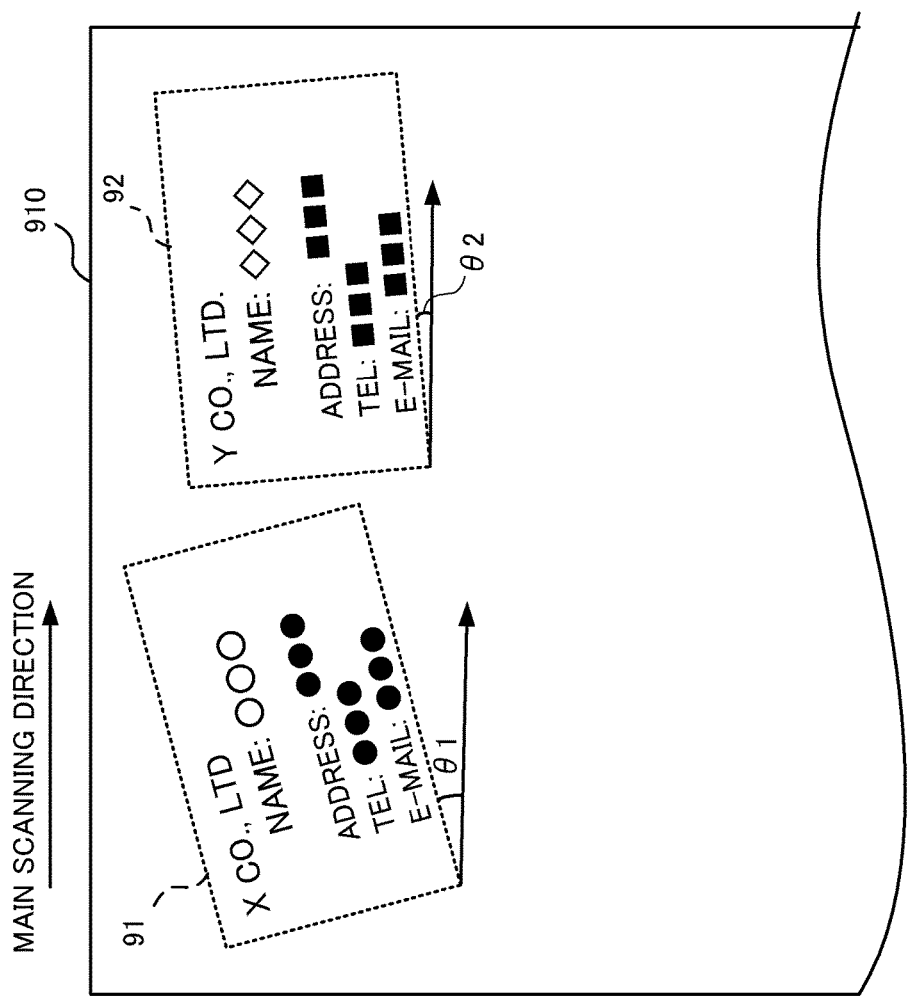
FIG. 8 is a view showing an example of the image read by the image reading section.

The example detailed next is in the case where the number of the clip region is 2 (N=2), and the second processing control section 102 executes the second clip processing. FIG. 8 is an example of the image 910 read by the image reading section 5.

Figure 9:
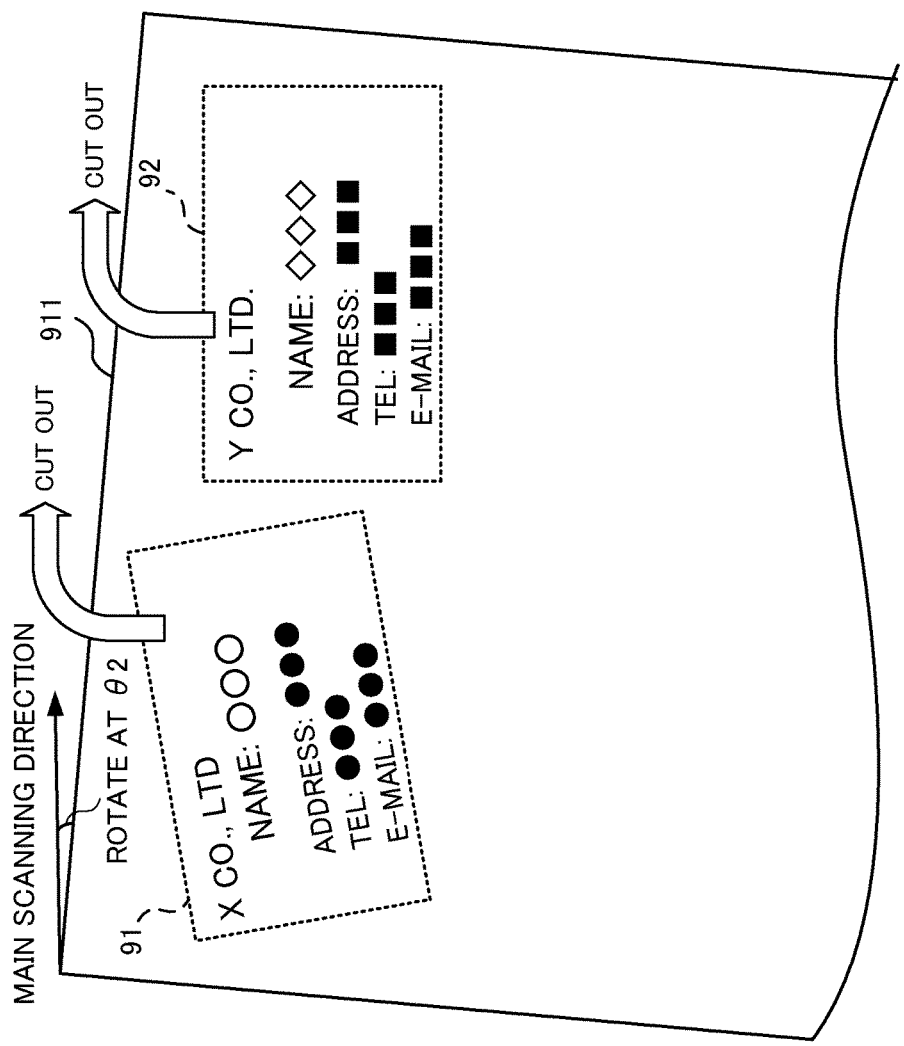
FIG. 9 is a view showing an example of the image after rotation.

The second clip processing begins with the process in which the clip region selection section 83 selects one clip region (step S19), and the inclination correction section 84 rotates the image 910, so that inclination of the clip region selected in step S19 becomes 0 (step S20). In the present embodiment, the clip region selection section 83 selects the region 92 and the inclination correction section 84 rotates the image 910 based on the inclination of the region 92. FIG. 9 shows an image 911 after the rotation. The clip processing section 85 cuts out all of the clip regions, which are the region 91 and the region 92, from the image 911 (step S21). Then, the second processing control section 102 ends the processing.

In the second clip processing, the second processing control section 102 cuts out all of the clip regions (the region 91 and the region 92) after rotating the image 910 for one time in accordance with inclination of the selected one clip region. In other words, the region 92 is cut out in a condition in which the inclination to the main scanning direction is 0, but the region 91 is cut out while being inclined. In this case, deterioration of image quality is a concern.

In this regard, it is desirable that the clip region selection section 83, for example, calculates a mean value of inclinations of the clip regions included in the image 910 (the region 91 and the region 92), and selects the clip region having the inclination closest to the mean value (for example, if the region 92 is the region having the inclination closest to the mean value, it is desirable to select the region 92). Thereby, the deterioration of image quality of the unselected clip region after being cut out can be minimized.

In addition, as the second processing control section 102 rotates the image read by the image reading section 5 just for one time, a process burden can be reduced and a process time can be shortened.

As described thus far, when the number of the clip regions is within the predetermined range (for example, when there are 3 to 8 business cards), the first processing control section 101 executes the first clip processing, so that each of the clip regions is cut out in the condition in which the inclination to the main scanning direction is 0. Accordingly, clipped images with good quality can be acquired.

However, the process burden becomes large and the process time increases because the first clip processing rotates the image for as many times as the number of the clip regions. In view of this, when there are many of the clip regions (for example, when there are 9 and more clip regions), the second processing control section 102 executes the second clip processing, thus to minimize the process burden and the process time.

When there are only few clip regions (for example, when there are 2 and less clip regions), because the number of the clip regions that are unselected in step S19 of FIG. 3 is small, i.e., because the number of the clip regions cut out while being inclined is small, the number of clip regions affected by the deterioration of image quality is small. Therefore, the process is performed under the second clip processing. Thereby, the process burden and the process time can be suppressed.

Figure 10:
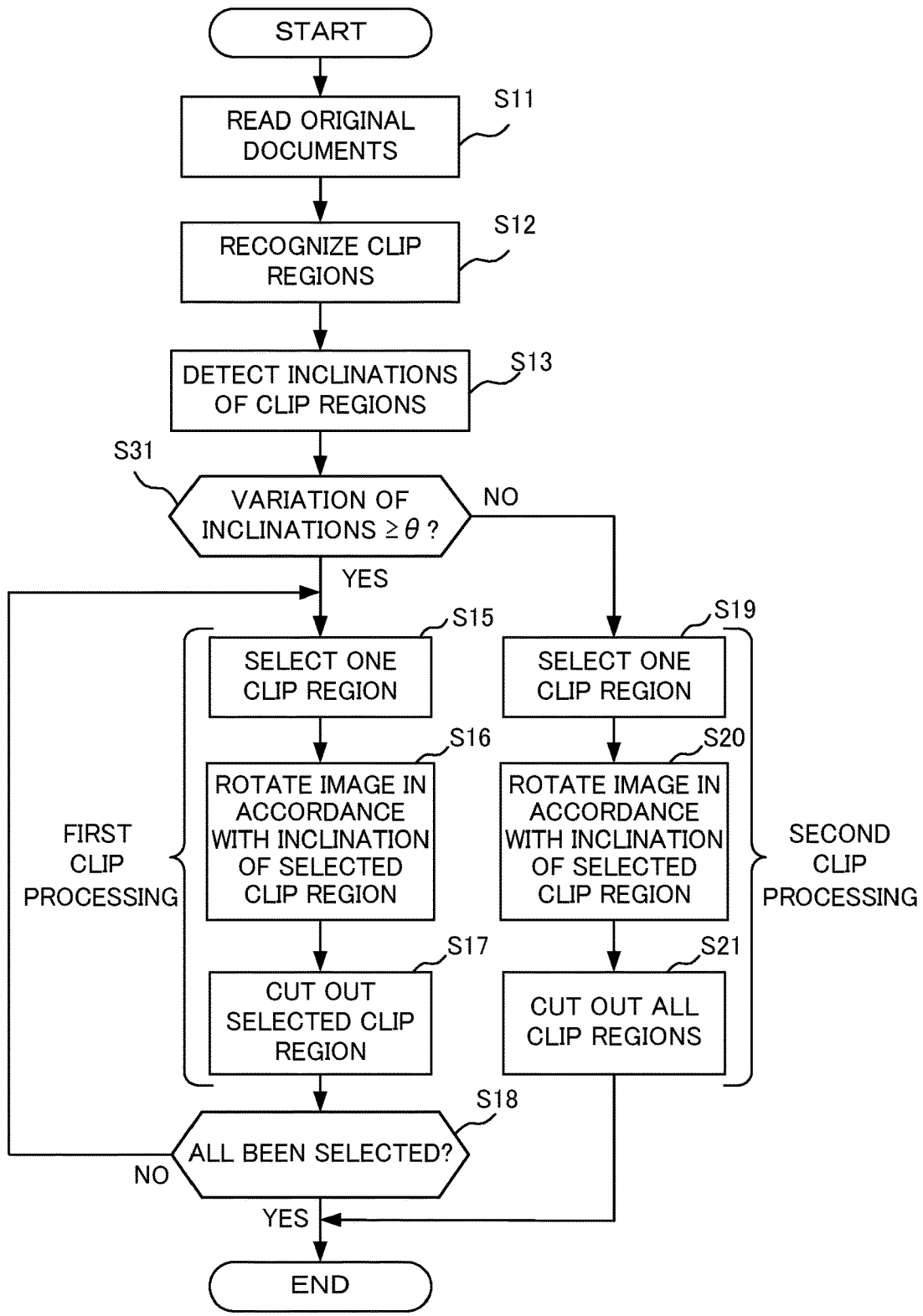
FIG. 10 is a flowchart showing a flow of another clip processing.

In the case described above, the control section 100 determines which of the first clip processing and the second clip processing is to be performed based on the number of the clip regions. Another method of determining which of the first clip processing and the second clip processing is to be performed will be detailed with reference to a flowchart illustrated in FIG. 10. In the method, the control section 100 performs the determination in accordance with variation (standard deviation) of the inclination of each of the clip regions. In FIG. 10, since the steps numbered in the same way as the flowchart shown in FIG. 3 represent the same processing, the description thereof will be omitted.

Subsequently to step S13, the control section 100 calculates the variation from the inclination of each of the clip regions. When the variation is a predetermined angle of θ or more (YES in step S31), the first processing control section 101 performs the first clip processing; when the variation is smaller than θ (NO in step S31), the second processing control section 102 performs the second clip processing.

In the second clip processing, the image is rotated for only one time in accordance with the inclination of the selected one clip region before all of the clip regions are cut out. For this reason, if the second clip processing is performed when the variation of the inclination of each of the clip regions is large, a lot of images are cut out while being greatly inclined. Therefore, when the variation of the inclination of each of the clip regions is large, by adopting the first clip processing, in which the image is rotated in accordance with each of the clip regions then the cut-out processing is performed, the deterioration of image quality of the image after being cut out can be prevented.

On the other hand, in the case where the variation of the inclination of each of the clip regions is small, for example, when the plurality of clip regions inclines to the same direction in the same angle, when the image is rotated for one time in accordance with the inclination of the selected one clip region, unselected other clip regions are also rotated in the same way, so that the inclinations of each of the clip regions become close to 0 and none of the clip regions is cut out while being greatly inclined. Therefore, when the variation of the inclination of each of the clip regions is small, by adopting the second clip processing, the process burden can be reduced and the process time can be shortened.

The present disclosure is not limited to the configurations of the above embodiment and can be modified in various ways. In the present embodiment, the above description has been given of the case where the control section 100 executes either one of the first clip processing and the second clip processing based on the number of the clip regions and based on the variation of the inclinations of the clip regions. However, the selection of either of the processing may be arbitrarily set by the user. For example, the first clip processing may be selected when the user wishes to acquire the clipped image with good quality, while the second clip processing may be selected when the user wishes to shorten the process time. Specifically, the operating section (input acceptance section) 7 accepts selective input regarding which one of the first clip processing and the second clip processing is to be executed. In accordance with the input that the operating section 7 has accepted, the control section 100 selects either of the first clip processing and the second clip processing. For example, when the operating section 7 has accepted the selection of the first clip processing, the control section 100 allows the first processing control section 101 to execute the first clip processing, and when the operating section 7 has accepted the selection of the second clip processing, the control section 100 allows the second processing control section 102 to execute the second clip processing.

Furthermore, when the control section 100 detects a size of a character included in the clip region and the character size is a predetermined size or smaller, it may be arranged that the first processing control section 101 executes the first clip processing; and when the character size is larger than the predetermined size, it may be arranged that the second processing control section 102 executes the second clip processing. For example, the control section 100 performs OCR processing on the image of the clip region to determine whether there is a character or not, and determines, based on the size of the part of the image that has been determined as including the character, whether or not the size of the character is the predetermined size or smaller.

In the case where the size of the character included in the clip region is small, if the clip region is cut out while being inclined, it is likely that the character becomes crushed and cannot be read from the image after the cut out. In such case, by adopting the first clip processing, in which the image is rotated in accordance with each of the clip regions then the cut-out processing is performed, the image with higher readability can be acquired.

On the other hand, in the case where the size of the character included in the clip region is large, even if the clip region is cut out while being inclined more or less, the character can be easily read from the image after the cut out. Therefore, by adopting the second clip processing, in which all of the clip regions are cut out after the image is rotated only for one time, the process burden can be reduced and the process time can be shortened.

In addition, in the case where the control section 100 determines whether a photographic image is included in the clip region and when the photographic image is determined as included, the first processing control section 101 may be arranged to execute the first clip processing in order to acquire the clipped image with good quality. In contrast, when the photographic image in not included, the second processing control section 102 may be arranged to execute the second clip processing in order to reduce the process burden and shorten the process time regardless of the image quality. The determination on whether the photographic image is included or not performed by the control section 100 can be performed by known technique.

As thus far described, in accordance with the number of the clip regions, the variation of the inclinations, the character size, and the presence or absence of the photographic image, either the first clip processing with image-quality-orientation and the second clip processing with short process time can be selectively executed. Accordingly, the best clip processing can be executed according to the situation.

In contrast, the generally known method referred to in the above BACKGROUND is not the method for switching the cut-out method into an appropriate method in accordance with the number of the business cards and with their placed direction when the plurality of original documents, such as business cards, is placed on the document table. In reading the plurality of original documents such as business cards placed on the document table, it is desired that the image quality is maintained and the process burden is reduced in accordance with the inclinations of the business cards and the number thereof. However, aforesaid general method cannot achieve the above.

In the case where the plurality of original documents is read at once, the present embodiment provides the image processing device, the image reading device, and the image forming apparatus, that are capable of performing the appropriate cut-out processing in accordance with the conditions such as the number of the original documents and the inclinations thereof.

Therefore, according to the present embodiment, the first processing control section 101 and the second processing control section 102 execute the appropriate cut-out processing suitable for the conditions such as the number of the clip regions, the variation of the inclination of the clip regions, the size of the character included in the clip region, and the presence or absence of the photographic image. Accordingly, the highly convenient image processing device, image reading device, and image forming apparatus are provided.

The first clip processing executed by the first processing control section 101 rotates the image based on each of the inclinations of the clip regions, and each of the clip regions is cut out thereafter. Thus, the clip regions are cut out without being inclined, so that the image quality of each of the clipped images is maintained. On the other hand, the second clip processing executed by the second processing control section 102 cuts out all of the clip regions after rotating the image just for one time based on the inclination of one clip region. Thus, the process burden is minimized and the process time is shortened. According to the present disclosure, out of the first clip processing executed by the first processing control section 101 and the second clip processing executed by the second processing control section 102, the second processing control section 10, can execute the control suitable for the condition.

It should be noted that the image forming apparatus 1 of the present embodiment is formed of the image reading device according to the embodiment of the present disclosure with the image forming section 12 (see FIG. 2) is added thereto. The image forming section 12 is of, for example, an ink-jet method or an electrophotographic method. Additionally, the image processing device according to the present embodiment is the device in which the image reading section 5 (see FIG. 2) is removed from the image reading device of the present embodiment. In the image processing device according to the present embodiment, the data sending/receiving section 9 acquires the image to be processed by the above detailed first processing control section 101, second processing control section 102, and the image processing section 8; the image is acquired from, for example, other personal computers connected to the network.

While the present disclosure has been described in detail with reference to the embodiments thereof, it would be apparent to those skilled in the art the various changes and modifications may be made therein within the scope defined by the appended claims.

What is claimed is:
1. An image processing device comprising:
   a clip region recognition section that recognizes each region of original documents as a clip region, the original documents being included in an image;
   an inclination detection section that detects an inclination of each of the clip regions;
   a clip region selection section that selects one clip region out of the clip regions;
   an inclination correction section that corrects an inclination of the image based on the inclination of the selected one clip region;
   a clip processing section that cuts out the one clip region from the image having been subjected to the inclination correction;
   a first processing control section that performs a first clip processing on each of all the clip regions recognized by the clip region recognition section, the first clip processing including processing of: allowing the clip region selection section to select the one clip region; subsequently allowing the inclination correction section to correct the inclination of the image based on the inclination of the selected one clip region; and subsequently allowing the clip processing section to cut out the selected one clip region from the image having been subjected to the inclination correction;
   a second processing control section that performs a second clip processing, the second clip processing including processing of: allowing the clip region selection section to select the one clip region; subsequently allowing the inclination correction section to correct the inclination of the image based on the inclination of the selected one clip region; and subsequently allowing the clip processing section to cut out all the clip regions from the image having been subjected to the inclination correction; and
   a control section that selects, in accordance with a predetermined condition, either one of the first clip processing performed by the first processing control section and the second clip processing performed by the second processing control section.

2. The image processing device according to claim 1, wherein
   when the clip region recognized by the clip region recognition section exists in number equal to or over a predetermined first number, the first processing control section executes the first clip processing,
   when the clip region recognized by the clip region recognition section exists in number fewer than the first number, the second processing control section executes the second clip processing, and
   when the clip region recognized by the clip region recognition section exists in number equal to or over a second number larger than the first number, the second processing control section executes the second clip processing.

3. The image processing device according to claim 1, wherein
   when variation among the inclinations of the clip regions detected by the inclination detection section is equal to or over a predetermined value, the first processing control section executes the first clip processing, and when the variation is smaller than the predetermined value, the second processing control section executes the second clip processing.

4. The image processing device according to claim 1, further comprising an input acceptance section that accepts selective input regarding which one of the first clip processing performed by the first processing control section and the second clip processing performed by the second processing control section is to be executed, wherein either one of the first clip processing performed by the first processing control section and the second clip processing performed by the second processing control section is executed in accordance with the input that the input acceptance section accepts.

5. The image processing device according to claim 1, wherein when a size of a character included in the clip region is equal to or smaller than a predetermined size, the first processing control section executes the first clip processing, and when the size of the character is larger than the predetermined size, the second processing control section executes the second clip processing.

6. The image processing device according to claim 1, wherein when the clip region includes a photographic image, the first processing control section executes the first clip processing and when the clip region does not include the photographic image, the second processing control section executes the second clip processing.

7. The image processing device according to claim 1, wherein the clip region selection section calculates a mean value of inclinations of the clip regions included in the image, and selects a clip region having the inclination closest to the mean value out of the clip regions, and the second processing control section allows the inclination correction section to correct the inclination of the image based on the inclination of the selected clip region.

8. An image reading device comprising:
an image reading section that reads one or a plurality of original documents as a single image; and
the image processing device according to claim 1.

9. An image forming apparatus comprising:
the image reading device according to claim 8; and
an image forming section that prints the image read by the image reading device.

* * * * *